April 19, 1960  H. J. BICHSEL  2,933,592
ARC WELDING APPARATUS
Filed Sept. 14, 1956  3 Sheets-Sheet 1

WITNESSES

INVENTOR
Harry J. Bichsel
BY
ATTORNEY

United States Patent Office 2,933,592
Patented Apr. 19, 1960

2,933,592
ARC WELDING APPARATUS

Harry J. Bichsel, East Aurora, N.Y., assignor to Westinghouse Electric Corporation, East Pittsburgh, Pa., a corporation of Pennsylvania Application September 14, 1956, Serial No. 609,899

7 Claims. (Cl. 219—131)

This invention relates to arc welding apparatus and has particular relation to automatic arc welding systems in which the welding is carried out with a consumable electrode in a shield of gas. This application is a continuation-in-part of application Serial No. 556,143, filed December 29, 1955, which is, in turn, a continuation-in-part of Patent 2,823,331, granted February 11, 1958. The above-mentioned filed applications are incorporated herein by reference and will be referred to herein as application and parent patent respectively.

The parent application discloses an automatic arc welding system which has been found to operate highly satisfactorily. But in certain situations, it has been found that a crater forms at the end of the weld. Crater formation is encountered particularly in welding in a shield of carbon dioxide or other gases the use of which leads to highly penetrating welds and the volume of the crater is greater the higher the welding speed. Since modern industry demands higher and higher speed welding the crater formation has become a serious problem.

The crater cannot be eliminated by simply stopping the welding electrode at the end of a weld and filling in the cavity; this leads to burning of a hole in the work. The practice has been to taper off the welding current and the deposit of metal at the end of the weld.

In accordance with teachings of the prior art, this tapering off is produced by gradually increasing the arc voltage. As a rule, such control is highly complex and costly, requiring a motor for varying the impedance, which reduces the voltage. In addition, it lacks precision.

It is accordingly, broadly an object of this invention to provide a highly precise, simple and low cost method of automatic arc welding, particularly with a consumable electrode in a shield of carbon dioxide or other gases the use of which leads to penetrating welds and in the practice of which method a crater shall not be produced at the end of a weld.

Another object of this invention is to provide arc welding apparatus particularly for automatic welding with a consumable electrode in a shield of carbon dioxide or the like which apparatus shall include simple and low cost means for crater elimination.

Another object of this invention is to provide a novel method of crater elimination in which the practice of the tapering off of the welding current shall be precisely predetermined.

An incidental object of this invention is to provide a novel motor control system.

In its specific aspects, this invention arises from the realization that in an arc welding system in which the power supply unit is of the constant potential type, as in the apparatus disclosed in the first and second parent applications, effective tapering off of the welding current to suppress craters may be achieved by reducing the speed of the motor that drives the welding electrode at a predetermined rate at the end of a weld. The invention in its specific aspects is then concerned with an arc welding system having a constant potential supply. In apparatus of the parent application the electrode motor has a braking resistor which is connected across the motor at the end of a weld and the tapering off of the welding current which eliminates the crater may be produced by connecting a braking resistor across the motor and permitting the motor to coast to a stop at a rate determined by the resistor. Crater elimination control of this type is satisfactory for certain purposes, but where high precision is required, difficulty has been encountered in applying it.

In addition, in welding with shielding gas such as carbon dioxide, it has been discovered as a result of the inventigation leading up to this invention, that the maximum arc length (that is the length of arc at which the arc can just be maintained) is short. When the distance between the electrode and the work is increased slightly beyond the maximum length, the arc is then extinguished. In attempting to eliminate the crater in welding with carbon dioxide by decreasing the speed of the feed motor as described above, it has been found that the arc is extinguished before enough electrode can be melted to fill the crates.

In accordance with this invention in its specific aspects the electrode motor is stopped at the end of a welding operation, not by connecting a braking resistor across it, but by reducing the power supplied to it at a predetermined controlled rate. This reduces the rate at which the electrode is supplied and results in tapering off the welding current in a predetermined time interval such that the crater is eliminated. Crater elimination control as just described, is peculiarly advantageous when incorporated in welding apparatus in which the power supply unit is of the constant-potential type since, when such a supply is used, the welding current may be effectively and precisely reduced by reducing the speed of the electrode. Thus in welding with constant potential welding apparatus embodying this invention in a shield of carbon dioxide, it has been found that during the controlled tapering off interval the arc voltage rises 1 to 4 volts as the motor speed is reduced at the controlled rate and the arc current decreases appreciably before the arc is broken so that the crater is effectively eliminated.

But, in its broader aspects, this invention is applicable to welding systems of other types in which the power supply unit may be of the constant-current variable-potential type. In such systems when the electrode is fed into the arc at a controlled reduced speed there is a reduction, at a controlled rate, of the energy being fed into the arc and thus, in a tapering off of the heating of the work and the supply of molten metal to the work which eliminates the crater.

The novel features considered characteristic of this invention are disclosed generally above. The invention itself, both as to its organization and method of operation, together with additional objects and advantages thereof will be understood from the following description of a specific embodiment taken in connection with the accompanying drawings, in which:

Fig. 3 is included herein for the purpose of aiding those skilled in the art in practicing this invention and not with any intention of limiting the scope thereof.

Description

Figure 1:
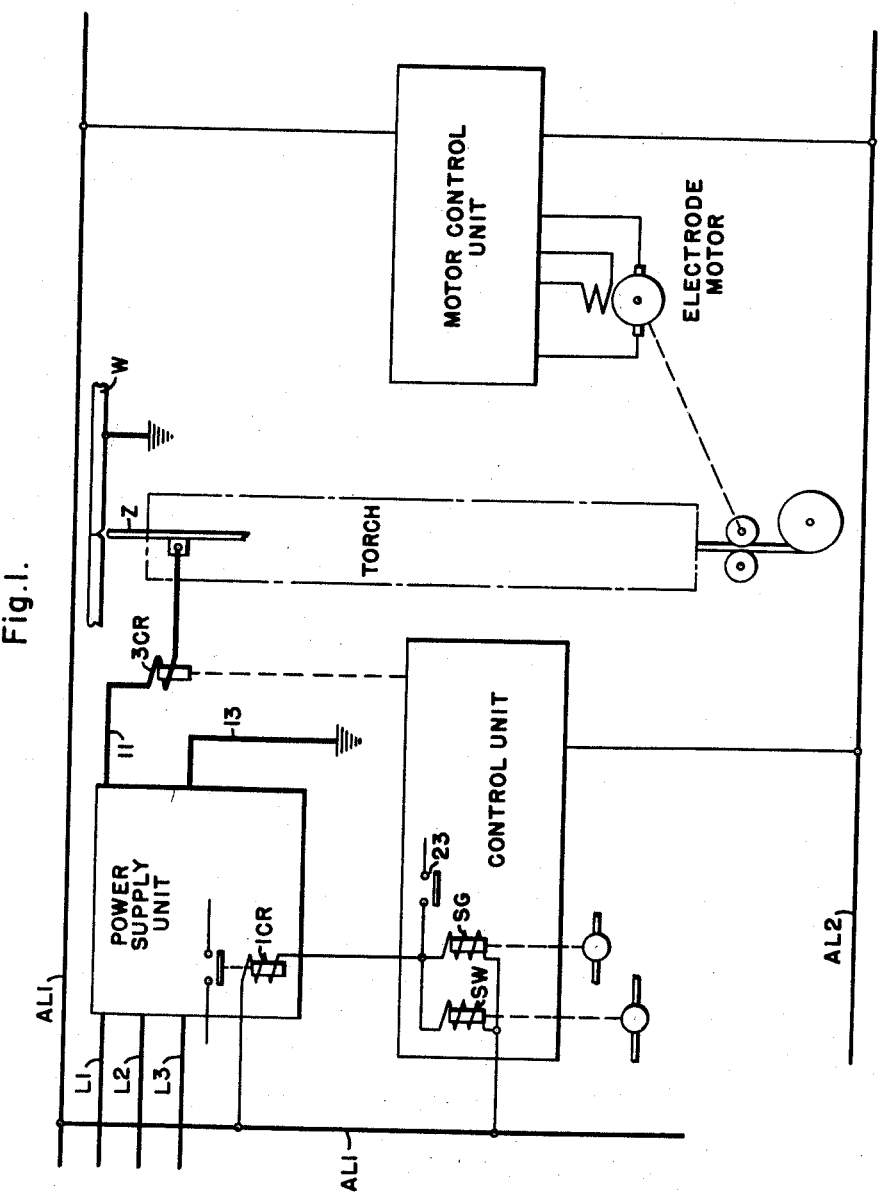
Figure 1 is a block diagram of a preferred embodiment of this invention.
Figure 2:
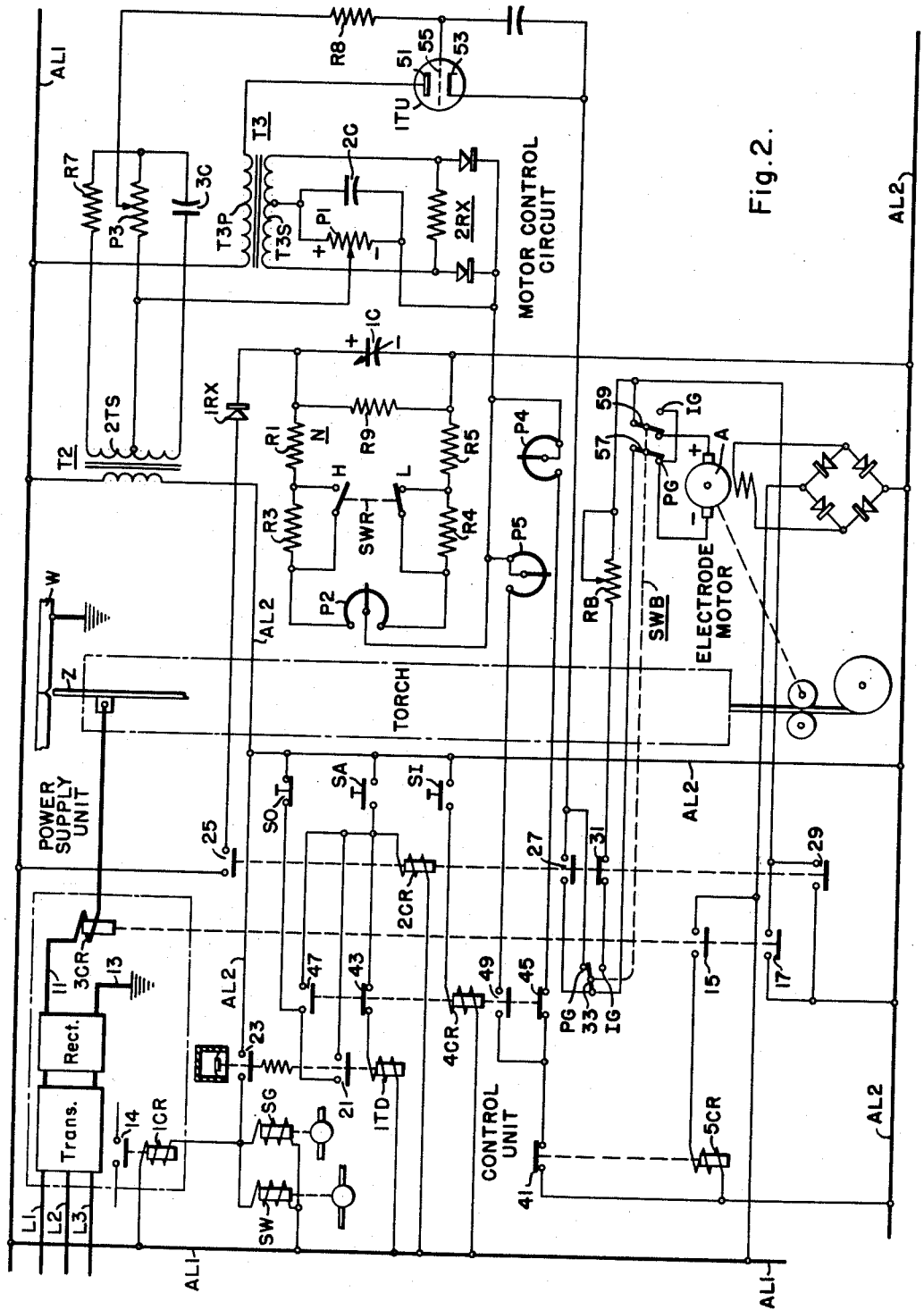
Fig. 2 is a circuit diagram of the Control Unit, and the Motor Control Circuit of the embodiment of this invention shown in Fig. 1.
Figure 3:
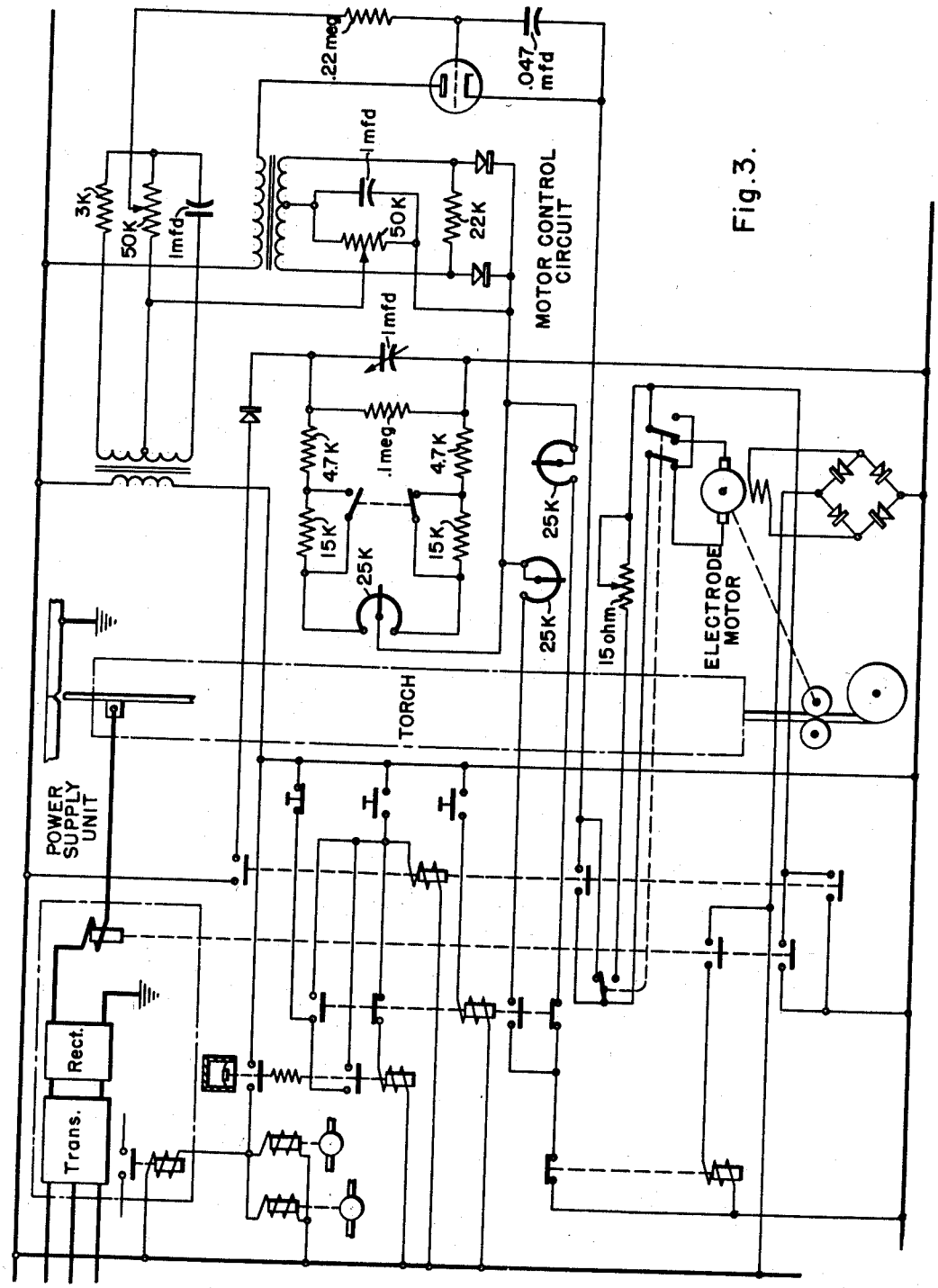
Fig. 3 is a diagram similar to Fig. 2 but showing the components actually included in an embodiment of this invention which, in use, has been found to operate highly satisfactorily.

The apparatus shown in the drawings includes a Power

Supply Unit; a Torch; an Electrode Motor, for driving the electrode Z through the Torch; a Motor Control Circuit, for controlling the speed of the Motor; and a Control Unit, for controlling the operation of the Motor and of the Power Supply Unit.

The Power Supply Unit is of the type described in the parent application and the parent patent and includes output terminals 11 and 13 to which the electrode Z and the work W are connected; the electrode Z being connected through a current relay 3CR. The relay 3CR has normally open contacts 15 and 17 in the Control Unit. The Power Supply Unit is energized from three phase conductors L1, L2, and L3. The Power Supply Unit includes a relay 1CR, which is actuable from the Control Unit to close a contact 14 to actuate the contactor (not shown) for energizing the output terminals 11 and 13 of the Power Supply Unit.

The Torch and the Electrode Motor are of the type described in the parent application and parent patent. The Motor differs from the Electrode Motor disclosed in the first and second parent applications in that it can be set either for welding with inert gas or with a penetrating gas such as carbon dioxide. For this purpose a switch SWB is provided. In the penetrating gas setting PG of the switch the Motor is connected to be supplied independently of the braking resistor RB; in the other position IG the switch SWB of the braking resistor RB is adapted to be connected across the armature A in the same manner as in the parent applications. This invention concerns itself primarily with welding with a penetrating gas and in the following discussion it will be assumed that the switch SWB is in the penetrating gas setting.

The Control Unit includes a time delay relay 1TD, relay 2CR, the inching relay 4CR and a relay 5CR.

The relay 1TD has a normally open instantaneous contact 21 and a normally open timing contact 23. When the relay 1TD is energized, both contacts are closed instantaneously. When the relay 1TD is deenergized, the contact 21 is opened instantaneously, the timing contact 23 opens only after a predetermined time interval. The relay 2CR has normally open contacts 25, 27, 29 and a normally closed contact 31. The contacts 27 and 31 are involved in the connection of the braking resistor and in the penetrating gas setting PG of the switch SWB. Contact 27 is shunted out and contact 31 is disconnected from the circuit by a contact 33 of switch SWB. The relay 5CR has a normally closed contact 41. The inching relay 4CR has a pair of normally closed contacts 43 and 45 and a pair of normally open contacts 47 and 49.

The coil of the timing relay 1TD is adapted to be connected between conductors AL1 and AL2 through a start push button SA and a normally closed contact 43 of relay 4CR. Relay 1TD when actuated is adapted to be locked in actuated condition between conductors AL1 and AL2 through stop push button SO, its normally open contact 21 and normally closed contact 43 of relay 4CR. The coil of the relay 2CR is adapted to be connected between the conductors AL1 and AL2 through a normally closed stop push button SO and through the instantaneous normally open contact 21 of relay 1TD. This coil is also adapted to be connected between conductors AL1 and AL2 through button SO and normally open contact of relay 4CR. The coil of relay 1CR, the gas supply solenoid SG and the cooling water supply solenoid SW are adapted to be connected in parallel between conductors AL1 and AL2 through the normally open timing contact 23 of relay 1TD. The coil of relay 5CR is adapted to be connected between conductors AL1 and AL2 through the normally open contact 15 of the current relay 3CR. The coil of relay 4CR is adapted to be connected between conductors AL1 and AL2 through the normally open inching push button SI.

The Motor Control Circuit includes a thyratron 1TU having an anode 51, a cathode 53, and a control electrode 55. This Circuit also includes a current transformer T3, having a primary T3P and a secondary T3S. The anode 51 and the cathode 53 are adapted to be connected between conductors AL1 and AL2 in a circuit including conductor AL1, the primary T3P, the anode 51, the cathode 53, contact 33 and a contact 57 of switch SWB, the armature A of the Electrode Motor, contact 59 of switch SWB and alternatively contact 17 of 3CR or contact 29 of 2CR to AL2.

The control circuit of thyratron 1TU includes facilities for impressing a composite potential including an alternating current component, an arbitrarily settable positive (grid to cathode) direct current component dependent on the rate at which it is desired the electrode be fed, a positive direct current component dependent on the current supplied to the Motor and the drop across the armature A which is a negative component. The arbitrary component is always greater than the armature component. The alternating current component is derived from a phase shift network, energized from transformer T2, having a second T2S, which has an intermediate tap. A capacitor 3C and a resistor R7 are connected in series across the secondary T2S. The phase shifted alternating component is derived from a potentiometer P3 between the junction of the capacitor 3C and the resistor R7 and the intermediate tap of the secondary T2S.

The direct current component for arbitrarily setting the rate of electrode feed is derived from a time constant network N, including a variable capacitor 1C shunted by a resistor R9 and a voltage divider R1, R3, R4, R5 which may be set for high range (H) or low range L by setting range switch SWR in one position or the other. The capacitor is adapted to be charged from conductors AL1 and AL2 through a rectifier 1RX and normally open contact 25 of the relay 2CR. Potential may be derived from the network N by a potentiometer P2. The anode-current dependent potential is derivable from the secondary T3S through a full-wave rectifier 2RX. The output of the rectifier is connected to charge the capacitor 2C, across which a potentiometer P1 is connected. For automatic inching purposes, the potentiometer P1 is connected to conductor AL2 through the potentiometer P4 and the normally closed contacts 45 and 41 of relays 4CR and 5CR. For manual inching purposes, the potentiometer P1 is adapted to be connected to the conductor AL2 through potentiometer P5, normally open contact 49 of relay 4CR, and normally closed contact 41 of relay 5CR.

During automatic or manual inching, the control circuit of thyratron 1TU extends from the control electrode 55 of the thyratron 1TU a grid resistor R8, the potentiometer P3, the potentiometer P1, the potentiometer P4, normally closed contacts 45 and 41 of relays 4CR and 5CR, respectively (for manual inching), or the potentiometer P5, normally open contact 49 of relay 4CR and normally closed contact 41 of relay 5CR (for automatic inching), AL2 either of normally open contacts 17 or 29 of relay 3CR or 2CR, contact 59, the armature A, contacts 57 and 33 to the cathode 53 of 1TU. For normal running operation, the control circuit of the 1TU extends from the control electrode 55 through resistor R8, potentiometer P3, potentiometer P1, potentiometer P2, and, depending upon the setting of the switch SWR, resistor R4 and resistor R5 or resistor R5 only, normally open contacts 17 or 29 of relay 3CR or 2CR, contact 59, armature A, contacts 57 and 33 to the cathode 55 of 1TU.

Capacitor 1C is charged through contact 25 when relay 2CR is actuated and is permitted to discharge through resistor R9 when the relay is deenergized. When the capacitor is charged, its potential in the control circuit of thyratron 1TU is such as to tend to increase the conductivity of this thyratron. Discharge of the capacitor tends to reduce the conductivity of thyratron 1TU. The higher the conduction of thyratron 1TU, the higher the speed of the Electrode Motor; the lower the conduction, the lower the speed of the Motor. The rate of feed of the electrode Z may thus be varied by varying the potential on capacitor 1C and thus the potential across resistors R4 and R5 or R5 alone.

Standby

In the standby condition of the apparatus the conductors L1, L2, L3, and AL1 and AL2 are energized. But start button SA is open and relay 1TD is deenergized so that relay 1CR and solenoids SG and SW are deenergized. Since relay 1CR is deenergized there is no potential between conductors 11 and 13. Relay 3CR is then deenergized and contacts 15 and 17 are open. Relay 5CR is then deenergized and contact 41 is closed. Since start button SA is open relay 2CR is deenergized. Contact 25 is open so that there is no charge on 1C. Contact 29 is open so that the Motor is deenergized. Relay 4CR is also deenergized and contacts 45 and 43 are closed and contacts 47 and 49 open.

When it is desired to inch the electrode Z manually button SI is closed momentarily actuating relays 4CR and 2CR through contact 47 of 4CR. Capacitor 1C is then charged through contact 25 of 2CR and the Motor Circuit is closed at contact 29 of 2CR. The electrode Z is then jogged towards the work. The jogging may continue until the electrode is in the desired position.

Operation

When a welding operation is to be carried out, the electrode Z is properly set with button SI and potentiometer P2 and switch SWR are set for the desired speed and then button SA is actuated. Relay 1TD is actuated closing contacts 21 and 23 immediately and relay 2CR is actuated closing contacts 25 and 29. Relay 1CR is actuated and solenoids SW and SG are energized through contact 23. Relay 2CR is locked in at contact 21. Contact 14 is now closed to energize the Power Supply Unit so that there is potential between conductors 11 and 13 and cooling water and gas is supplied to the Torch.

At contact 25 capacitor 1C is charged; at contact 29 the Motor Circuit is closed. At this point relay 3CR is deenergized because the electrode Z is away from the work W and relay 5CR is deenergized so that the electrode Z is automatically inched towards the work W at a speed determined by the setting of P5.

When the electrode Z contacts the work W, current flows between the electrode and the work and an arc is struck. In addition, relay 3CR is actuated closing contacts 15 and 17. At contact 15 relay 5CR is energized opening the automatic inching circuit; at contact 17 the Motor Circuit is closed independently of the relay 2CR. The welding now proceeds with the electrode fed at a speed determined by P2.

At the end of the welding operation stop button SO is opened. Relays 1TD and 2CR are then deenergized. Contacts 21, 25 and 29 open at once but contact 23 remains closed for the time set by the relay 1TD. 1CR, SW and SG then remain energized during this time and current continues to flow between Z and W and gas and cooling water continue to be supplied. Delay 3CR remains actuated so that the Motor remains energized in spite of the opening of contact 29 but the charging of the capacitor 1C stops and it discharges through R9 and R1, R3, R5 or R1, R4, R5 depending on the setting of switch SWR. Because of the discharge of capacitor 1C the speed of the Motor decreases and the electrode is fed at a lower and lower speed until the arc is interrupted. The flow of molten metal thus tapers off and there is no crater. After the arc is broken contact 23 opens and the apparatus is reset for another operation.

Where it is desired to vary the crater fill the capacitor 1C may, in accordance with this invention, be varied over a substantial range or the discharge resistance R9 for the capacitor may be varied. Thus it has been found that the crater fill may effectively be varied by varying the capacitor 1C between 3 microfarads and 10 microfarads. Variation of the capacitor 1C to vary the crater fill is to be preferred to variation of the resistor R9 since when the resistor R9 is reduced to a low magnitude ripple is introduced into the control circuit of thyratron 1TU.

Conclusion

A novel automatic arc welding system which operates to eliminate a crater at the end of a weld in a simple manner has been disclosed above. While this system and its method of operation constitute a preferred embodiment of this invention, many modifications thereof are feasible. The invention then is not to be restricted except as is necessitated by the spirit of the prior art.

I claim as my invention:

1. Arc welding apparatus for welding work with a consumable welding electrode comprising a motor connected to said electrode for advancing said electrode to said work, first power supply means, first means to be actuated for connecting said power supply means to said electrode and work to supply current for welding therebetween, second power supply means, an electric device having at least an anode, a cathode, and a control electrode, second means to be actuated connecting said motor in circuit with said second supply means and said anode and cathode to energize said motor through said anode and cathode, a control circuit for said device including said control electrode and said cathode and also including a time constant network including a capacitor connected in said control circuit so that the potential on said capacitor determines the conductivity of said device and means for discharging said capacitor, means connected to said network for continuously charging said capacitor to a potential of a polarity such that the higher said potential, the higher the conductivity of said device, means for actuating said first actuable means, means for actuating said second actuable means whereby when said first and second actuable means are actuated, said electrode is advanced towards said work and welding current flows, means to be actuated for terminating a welding operation, means responsive to actuation of said terminating means connected to said first actuable means for maintaining said first actuable means actuated for a predetermined time interval after said terminating means is actuated and thereafter rendering said first actuable means unactuated, and means responsive to said actuation of said terminating means and connected to said charging means for interrupting the charging of said capacitor on actuation of said terminating means so that said capacitor discharges through said discharging means, said capacitor discharging through said discharging means in a time interval such that said arc is interrupted by reason of the decrease in the speed of said motor prior to termination of said predetermined interval.

2. The method of arc welding work with a consumable electrode fed by a motor into an arc between said electrode and said work which includes the novelty of gradually tapering off the supply of molten electrode to said work at the end of a weld by continuously reducing the speed of said motor at a predetermined rate, said rate corresponding to the desired rate of said tapering off.

3. Arc welding apparatus for welding work with a consumable electrode comprising in combination first power supply means, means for connecting said supply means between said electrode and said work to produce and maintain an arc therebetween, second power supply means, a motor connected to said electrode for feeding said electrode into said arc, coupling means between said second supply means and said motor for energizing said motor from said second supply means, said coupling means including means for varying the speed of said motor and means to be actuated connected to said connecting means and said coupling means for terminating a welding operation, said actuable means reducing the speed of said motor at a predetermined rate during a predetermined time interval and maintaining said first supply means in energizing connection between said electrode and work during said interval.

4. In combination a motor, an electric discharge device having an anode, a cathode, and a control electrode, power supply means, means connecting said power supply means in circuit with said motor and said anode and cathode, a circuit connected between said control electrode and cathode of said device for controlling the conductivity thereof, said circuit including first means for impressing an alternating component of potential and second means for impressing a direct current component of potential between said control electrode and cathode, said second means including a time constant network, means connecting said supply means to said network to charge said network, said connecting means including switch means, and selectively operable means for opening said switch means.

5. Arc welding apparatus for welding work with a consumable electrode comprising in combination first power supply means, said first means being of the constant potential type, means for connecting said supply means between said electrode and said work to produce and maintain an arc therebetween, second power supply means, a motor connected to said electrode for feeding said electrode into said arc, coupling means between said second supply means and said motor for energizing said motor from said supply means, said coupling means including means for varying the speed of said motor and means to be actuated connected to said connecting means and said coupling means for terminating a welding operation, said actuable means reducing the speed of said motor at a predetermined rate during a predetermined time interval and maintaining said first supply means in energizing connection between said electrode and work during said interval.

6. In combination a motor, an electric discharge device having an anode, a cathode, and a control electrode, power supply means, means connecting said power supply means in circuit with said motor and said anode and cathode, a circuit connected between said control electrode and cathode of said device for controlling the conductivity thereof, said circuit including first means for impressing an alternating component of potential and second means for impressing a direct current component of potential between said control electrode and cathode, said second means including a time constant network, and third means for impressing a direct current component of potential dependent on the current conducted by said motor, means connecting said supply means to said network to charge said network, said connecting means including switch means, and selectively operable means for opening said switch means.

7. The method of arc welding work with a consumable electrode fed by a motor into an arc between said electrode and said work, said arc being supplied by a constant potential supply and being shielded by a gas such as carbon dioxide which tends to produce high penetration of the arc into said work, which includes the novelty of gradually tapering off the supply of molten electrode to said work at the end of a weld by continuously reducing the speed of said motor at a predetermined rate, said rate corresponding to said gradual tapering off.

References Cited in the file of this patent
UNITED STATES PATENTS

| | | |
|---|---|---|
| 2,152,785 | Blankenbuehler | Apr. 4, 1939 |
| 2,260,510 | Clapp | Oct. 28, 1941 |
| 2,806,127 | Hackman et al. | Sept. 10, 1957 |
| 2,877,339 | Catlett | Mar. 10, 1959 |

OTHER REFERENCES

"Welding Journal," September 1955, pp. 839–845.